(12) United States Patent
Sasaki et al.

(10) Patent No.: US 8,972,626 B2
(45) Date of Patent: Mar. 3, 2015

(54) CONTENT REPRODUCING DEVICE AND CONTENT REPRODUCTION CONTROL METHOD

(75) Inventors: Takashi Sasaki, Tokyo (JP); Ryuya Tachino, Kanagawa (JP); Ryo Oguchi, Tokyo (JP); Kenichi Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 198 days.

(21) Appl. No.: 13/490,622

(22) Filed: Jun. 7, 2012

(65) Prior Publication Data

US 2012/0320275 A1     Dec. 20, 2012

(30) Foreign Application Priority Data

Jun. 17, 2011   (JP) ................................. 2011-135147

(51) Int. Cl.
  *G06F 3/00*    (2006.01)
  *G06F 13/00*   (2006.01)
  *H04N 5/765*   (2006.01)

(52) U.S. Cl.
  CPC ..................................... *H04N 5/765* (2013.01)
  USPC ...................... 710/38; 710/8; 710/9; 710/316

(58) Field of Classification Search
  None
  See application file for complete search history.

(56) References Cited

U.S. PATENT DOCUMENTS

| | | | |
|---|---|---|---|
| 7,904,593 B2 | 3/2011 | Ohkita | |
| 2009/0284656 A1 | 11/2009 | Suzuki et al. | |
| 2010/0053463 A1* | 3/2010 | Yeh et al. | 348/734 |
| 2010/0097529 A1 | 4/2010 | Tokoro | |
| 2010/0128185 A1 | 5/2010 | Nakagawa et al. | |
| 2010/0188567 A1* | 7/2010 | Ichimura et al. | 348/441 |
| 2011/0047296 A1 | 2/2011 | Ohkita | |
| 2012/0169725 A1* | 7/2012 | Shimizu et al. | 345/419 |
| 2013/0304860 A1* | 11/2013 | Yang et al. | 709/217 |
| 2013/0336631 A1* | 12/2013 | Kura | 386/230 |

FOREIGN PATENT DOCUMENTS

| | | |
|---|---|---|
| JP | 2008-035192 A | 2/2008 |
| JP | 2009-071396 A | 4/2009 |

(Continued)

OTHER PUBLICATIONS

European Search Report EP 12167087, dated Jul. 26, 2012.

(Continued)

*Primary Examiner* — Idriss N. Alrobaye
*Assistant Examiner* — David Martinez
(74) *Attorney, Agent, or Firm* — Sony Corporation

(57) ABSTRACT

A content reproducing device includes: an input unit connected to a source side via a content transmission channel for transmitting a content and a control signal transmission channel for transmitting an address representing a physical connection relation of a device; an output unit connected to a sink side via a content transmission channel for transmitting a content and a control signal transmission channel for transmitting an address representing a physical connection relation of a device; and a switch provided between the input and output units and assuming one of a first connection state of connecting between the input and output units and a second connection state of connecting the input unit and a content reproducing unit, the device acquiring the address at the sink side in the first connection state, and setting the acquired address as the address provided to the source side in the second connection state.

7 Claims, 8 Drawing Sheets

(56) References Cited

FOREIGN PATENT DOCUMENTS

| | | | |
|---|---|---|---|
| JP | 2009246514 A | 10/2009 | |
| JP | 2009-272661 A | 11/2009 | |
| JP | 2009-284374 A | 12/2009 | |
| JP | 2009-303273 A | 12/2009 | |
| JP | 2010-130543 A | 6/2010 | |
| JP | 2010-193095 A | 9/2010 | |
| JP | 04-621787 | 11/2010 | |
| JP | 2010-259118 A | 11/2010 | |
| JP | 2011-004198 | 1/2011 | |

OTHER PUBLICATIONS

HDM : "High Definition Multimedia Interface. Specification Version 1.4" Internet Citation, Mar. 23, 2010, p. 425, XP 009133650.

* cited by examiner

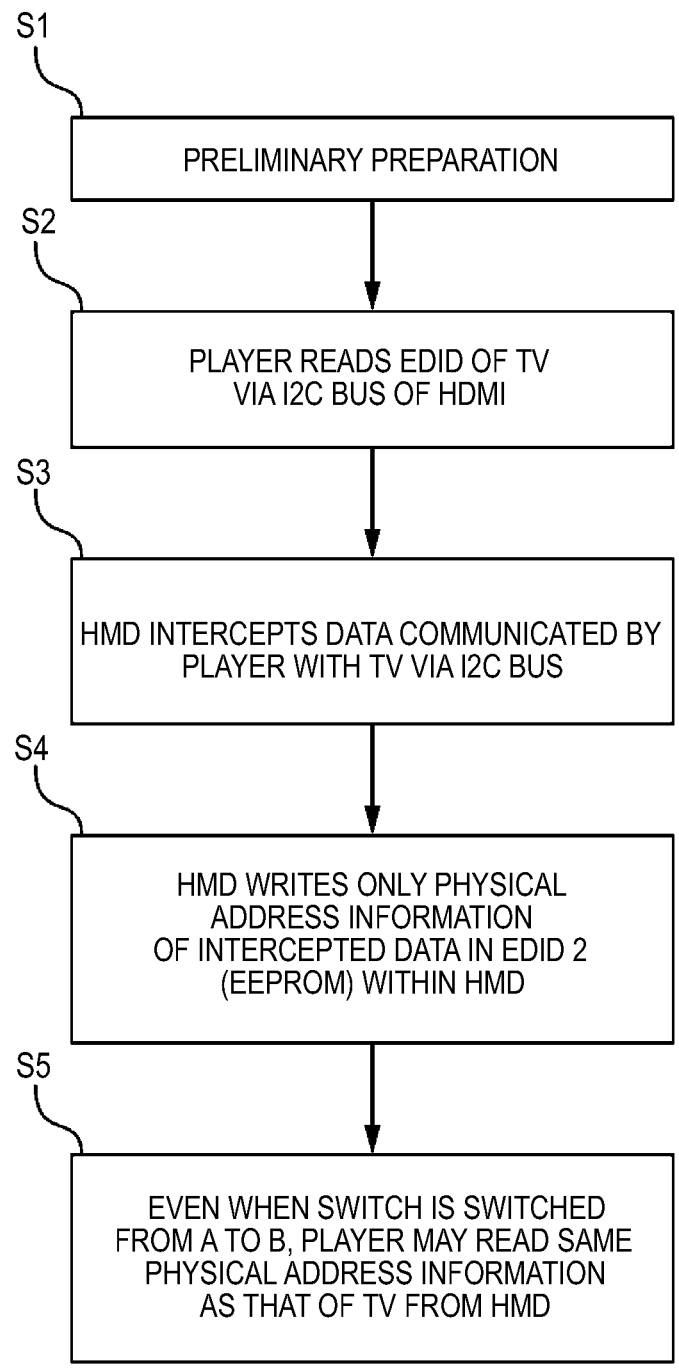

CONTENT REPRODUCING DEVICE AND CONTENT REPRODUCTION CONTROL METHOD

CROSS-REFERENCE TO RELATED APPLICATION

The present application claims priority from Japanese Patent Application No. JP 2011-135147 filed in the Japanese Patent Office on Jun. 17, 2011, the entire content of which is incorporated herein by reference.

FIELD

The present disclosure relates to a content reproducing device connected to a broadcast receiving device via an HDMI cable, for example, and a content reproduction control method.

BACKGROUND

As an AV interface for digital home appliances, an HDMI (High-definition multimedia interface, registered trademark) is in widespread use. The HDMI is a digital interface for high-speed transmission of baseband signals containing signals of images (moving images) and sound signals accompanying the images. The HDMI standard is a standard arranged for AV (Audio Visual) devices by adding a sound transmission function and a copyright protection function to DVI (Digital Visual Interface) as a connection standard for PCs (Personal Computers) and displays.

There are three types of devices connected via HDMI of an HDMI source, an HDMI sink, and an HDMI repeater. The HDMI source is a device that outputs signals of images and sound via HDMI, and the HDMI sink is a device that receives and reproduces signals of images and sound. The HDMI repeater is a device including one or more input terminals and one or more output terminals and having a function of distribution and switching of signals, and relays between the HDMI source and the HDMI sink.

The HDMI has a content transmission channel (signal channel) for transmitting signals of images and sound of the baseband from the HDMI source via the necessary HDMI repeater to the HDMI sink. The HDMI has a control signal transmission channel (control channel) for interactively transmitting control signals (control data). The control signal transmission channel is a transmission channel for DDC (Display data channel) and CEC (Consumer Electronics Control). The DDC transmits EDID (Extended Display Identification data) describing properties of the number of pixels and the size of the display. The CEC is a function of controlling the devices connected via HDMI. These transmission channels, a 5V power supply, grounds for the respective signals are collected in one HDMI cable.

The devices connected via the HDMI cable may be remotely operated using CEC. For example, when a play button of a reproducing device connected to a broadcast receiving device by an HDMI cable is pressed, power of the broadcast receiving device is turned on and enables operation of switching the input of the broadcast receiving device to the input to which the reproducing device is connected. For realization of the input switching, addresses indicating the physical connection relation of the devices (called "physical addresses") are used.

The broadcast receiving device (root) located at the peak of the connection tree has a physical address "0.0.0.0". The device connected to the broadcast receiving device acquires a different physical address in response to the input terminal to which the device is connected. The physical addresses are stored in an EDID-ROM that the broadcast receiving device has inside. In the case where "2.0.0.0" is stored as a physical address in the input terminal of the broadcast receiving device, the device connected to the input terminal, for example, an AV amplifier acquires the physical address by DDC (Display Data Channel) communication, and recognizes the acquired physical address as the physical address of the device. Further, a Blu-ray Disc (BD, registered trademark) player connected to the AV amplifier reads out the EDID-ROM of the terminal to which the player is connected and acquires a physical address "2.1.0.0".

The respective devices in connection may grasp the mutual connection relations by the physical addresses. For example, the respective sources connected to the broadcast receiving device transmit the acquired physical addresses using CEC commands. The broadcast receiving device may determine from which input terminal content data is supplied depending on the received physical address, and selects appropriate input.

Patent Document 1 (JP-A-2009-2465140) discloses solution to a problem caused by presence of a device specified with its own EDID-ROM unreadable when the power is in the standby state.

SUMMARY

As a repeater having plural input terminals, for example, an AV amplifier, there is a device of the type that may not update the physical addresses of other HDMI input terminals than that to which a source device in selection is connected among plural HDMI input terminals when the physical address of the sink at the HDMI output terminal side changes. In the case of the device, when the device having the physical address that has not been updated is selected, there has been a problem that predetermined CEC control is not conducted. The configuration disclosed in Patent Document 1 is impossible to solve the problem.

It is therefore desirable to provide a content reproducing device and a content reproduction control method that can solve the problem when all physical addresses of plural HDMI input terminals such as an AV amplifier may not be updated by recognition of physical addresses of devices connected to its HDMI output terminals.

An embodiment of the present disclosure is directed to a content reproducing device including an input unit connected to a source side via a content transmission channel for transmitting a content and a control signal transmission channel for transmitting an address representing a physical connection relation of a device, an output unit connected to a sink side via a content transmission channel for transmitting a content and a control signal transmission channel for transmitting an address representing a physical connection relation of a device, and a switch that is provided between the input unit and the output unit and assumes one of a first connection state of connecting between the input unit and the output unit and a second connection state of connecting the input unit and a content reproducing unit, and the device acquiring the address at the sink side transmitted via the control signal transmission channel in the first connection state of the switch, and setting the acquired address as the address provided to the source side in the second connection state of the switch.

Another embodiment of the present disclosure is directed to a content reproduction control method including connecting to a source side via a content transmission channel for transmitting a content and a control signal transmission channel for transmitting an address representing a physical connection relation of a device by an input unit, connecting to a sink side via a content transmission channel for transmitting a content and a control signal transmission channel for transmitting an address representing a physical connection relation of a device by an output unit, switching a first connection state of connecting between the input unit and the output unit and a second connection state of connecting the input unit and a content reproducing unit by a switch provided between the input unit and the output unit, and acquiring the address at the sink side transmitted via the control signal transmission channel in the first connection state of the switch, and setting the acquired address as the address provided to the source side in the second connection state of the switch.

According to the embodiments, when the switching unit is in the first connection state, the content reproducing device passes through the content and the address. In the first connection state, the address of the sink device is acquired and the acquired address is set as the address of itself. Therefore, when the switching unit is switched from the first connection state to the second connection state, no problem that a predetermined CEC function is unrealizable is caused.

BRIEF DESCRIPTION OF THE DRAWINGS

FIG. 8 is a flowchart showing a flow of processing of one embodiment of the present disclosure.

DETAILED DESCRIPTION

Hereinafter, embodiments will be explained. The embodiments explained as below are preferable specific examples and provided with various technically preferable limitations, however, the range of the present disclosure is not limited to the embodiments in the absence of description that specifically limits the present disclosure in the following explanation.

<Outline of System>

Figure 1:
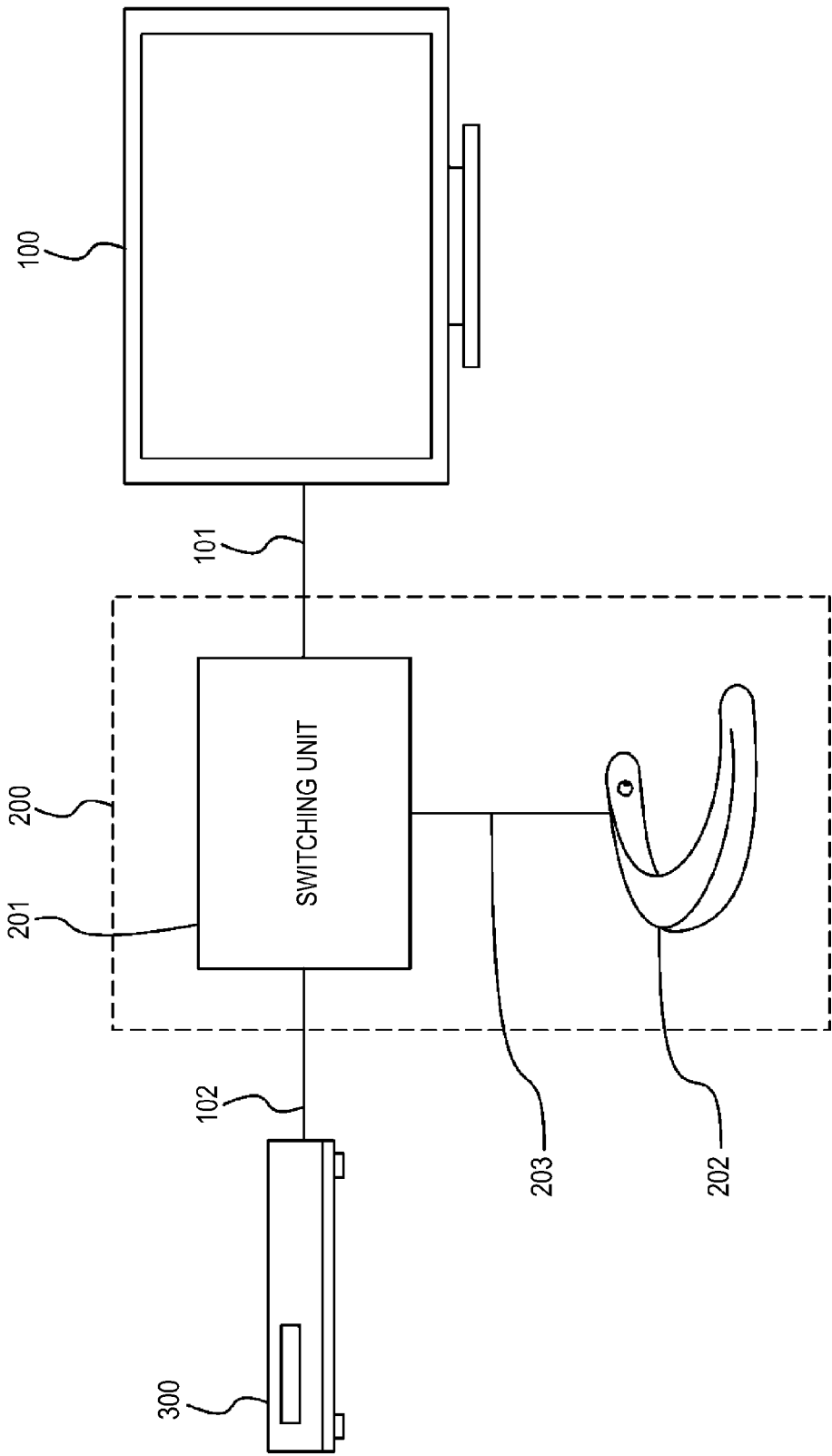
FIG. 1 is a schematic diagram showing a general configuration of a content reproduction system to which the present disclosure is applicable.

As shown in FIG. 1, in one embodiment, to a sink device, for example, a broadcast receiving device (TV in the drawing) 100, a content reproducing device, for example, a head mounted display (HMD in the drawing) 200 is connected via an HDMI cable 101. A Blu-ray disc player (hereinafter, referred to as "BD player") 300 is connected to the head mounted display 200 via an HDMI cable 102. The broadcast receiving device 100 may receive television broadcasting, may be connected to the Internet, and may reproduce contents on the Internet.

The head mounted display 200 includes a switching unit 201 and a 3D (three-dimensional) reproducing unit 202. The 3D reproducing unit 202 is provided with a display part including two organic EL panels that can be seen with eyes, for example, on the rear side of the belt part attached to the head. The resolution of the display part is set to (1280×720), for example. The two organic EL panels enable 3D display. Headphones are respectively provided at ends of the belt part and enable virtual 5.1-channel audio reproduction, for example. Video/audio data is supplied from the switching unit 201 via a cable 203 to the 3D reproducing unit 202. In place of the cable 203, the video/audio data may be transmitted via wireless transmission.

<Connection Configuration of System>

Figure 2:
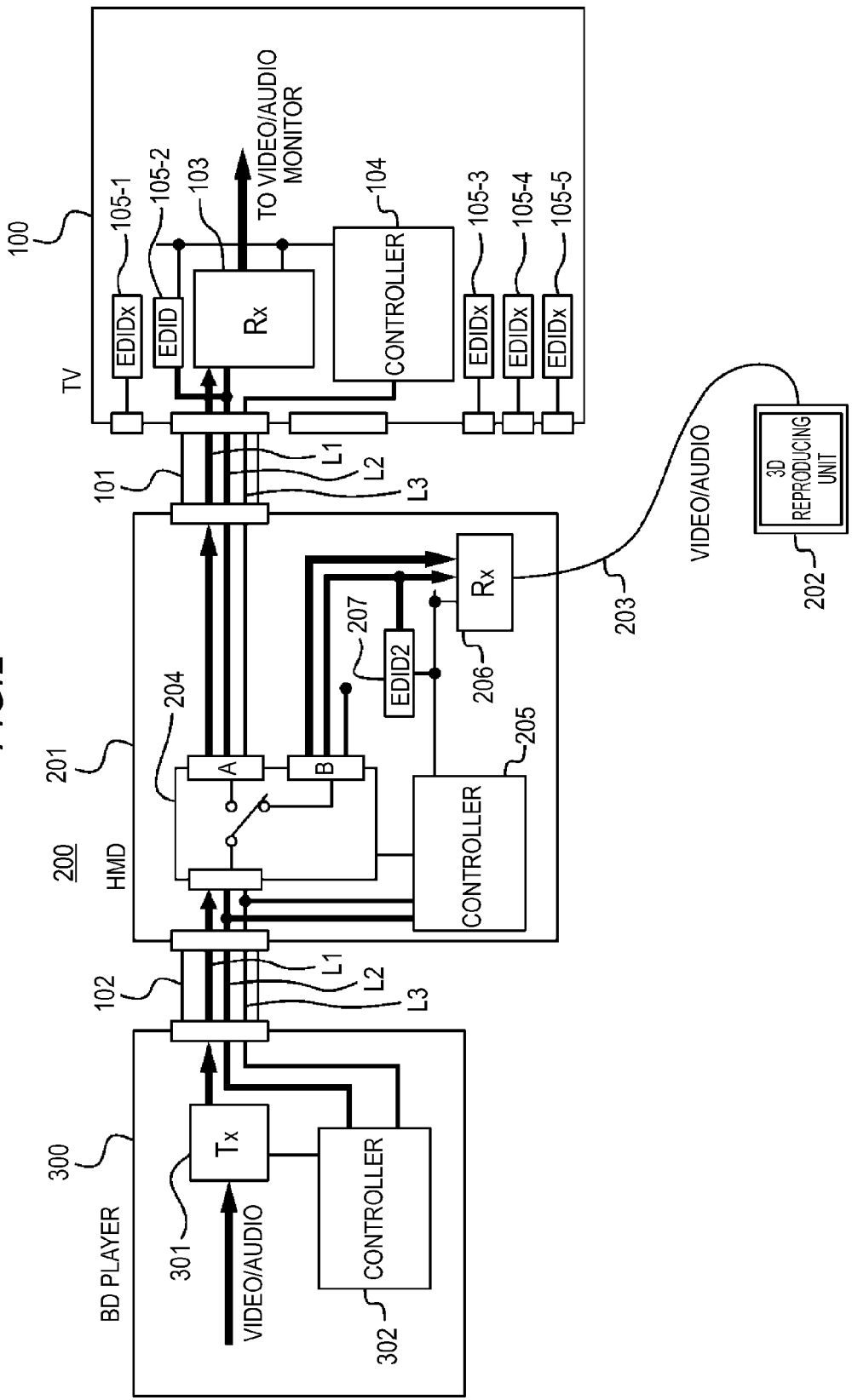
FIG. 2 is a connection diagram showing connection relations of the content reproduction system to which the present disclosure is applicable.

FIG. 2 shows a configuration with respect to connections among the broadcast receiving device 100, the head mounted display 200, and the BD player 300. FIG. 2 only shows the configuration with respect to the connections between devices and the configuration with respect to processing of content data such as signal processing for signal reproduction of the BD player 300 is omitted for simplicity.

The BD player 300 supplies video/audio data reproduced from a BD to a transmitting unit 301. The transmitting unit 301 supplies the video/audio data to the head mounted display 200 in the HDMI format via the HDMI cable 102. The HDMI cables 101 and 102 each have a video/audio bus L1, an I2C bus L2, and a CEC bus L3.

The I2C bus provides synchronous serial communication of communication using two signal lines of a serial clock and interactive serial data. Plural slaves may be connected to the bus, and a master may select a slave by designating an address of the slave and communicate with the slave.

The video/audio bus L1 contains a differential signal channel for TMDS (Transition minimized Differential Signal) of multiple channels and a clock signal transmission channel. The I2C bus L2 transmits DCC (Display Data Channel) describing performance of the display such as the number of pixels and the size, and further transmits data for HDCP (High bandwidth Digital Content Protection) necessary for the content protection function. The CEC bus L3 transmits data for controlling the devices connected by HDMI.

For example, in the content reproduction (display) system in FIG. 1, the broadcast receiving device 100 has a function as an HDMI sink and the BD player 300 has a function as an HDMI source. The switching function of the head mounted display 200 is a function as an HDMI repeater (switch type), and the content reproduction function of the head mounted display itself is a function as an HDMI sink. The respective devices forming the content reproduction system are respectively compliant with CEC, and can perform cooperative operation in response to the reproducing operation in the BD player 300 and the power-off operation and the selecting operation in the broadcast receiving device.

The I2C bus L2 and the CEC bus L3 are connected to a controller for HDMI/CEC control 302 of the BD player 300. The controller for HDMI/CEC control 302 includes a CPU (Central Processing Unit), a flash ROM, a DRAM (Dynamic Random Access Memory), etc. connected via internal buses. Other controllers for HDMI/CEC control 205 and 104 have the same configuration.

The switching unit 201 of the head mounted display 200 has a physical switch 204, the controller for HDMI/CEC control 205, and a receiving part 206, and an EDID (Extended Display Identification Data)-ROM (nonvolatile memory)

207. In the switching unit 201, the I2C bus L2 and the CEC bus L3 are connected to the controller for HDMI/CEC control 205 from between an input terminal and the switch 204. The physical address of the head mounted display 200 is stored in the EDID-ROM 207.

The switch 204 is controlled by the controller for HDMI/CEC control 205 and connects an HDMI input terminal (hereinafter, appropriately simply referred to as "input terminal") connected to the HDMI cable 102 to one of a terminal A (hereinafter, appropriately simply referred to as "A side") and a terminal B (hereinafter, appropriately simply referred to as "B side"). The A side is connected to the sink side. To the A side, the broadcast receiving device 100 is connected via an HDMI output terminal (hereinafter, appropriately simply referred to as "output terminal") and the HDMI cable 101. The B side is connected to the receiving part 206 within the switching unit 201. The 3D reproducing unit 202 is connected to the receiving part 206 via the cable 203.

Therefore, in the first connection state in which the switch 204 selects the A side, the video/audio (content) data reproduced by the BD player 300 is supplied through the switching unit 201 via the HDMI cable 101 to the broadcast receiving device 100. In the second connection state in which the switch 204 selects the B side, the video/audio (content) data reproduced by the BD player 300 and control data are supplied via the switch 204 to the receiving part 206, and the 3D reproducing unit 202 performs 3D reproduction. Switching of the switch 204 is performed according to an instruction from a user interface (not shown), for example.

The broadcast receiving device 100 has a receiving unit 103, the controller for HDMI/CEC control 104, and an EDID-ROM 105-2. The video/audio data output from the receiving unit 103 is supplied to a monitor such as a liquid crystal display. In the EDID-ROM 105-2, an EDID to be provided to the upstream device connected to the input terminal of the broadcast receiving device 100 is stored. In the case where the broadcast receiving device 100 has plural input terminals, EDID-ROMs 105-1, 105-2, 105-3, 105-4, 105-5 in which different EDIDs with respect to each input terminal are provided.

<Connection Relations and Physical Addresses>

In one embodiment of the present disclosure, in either of the state in which the switch 204 selects the A side (broadcast receiving device 100 side) and the state in which the switch selects the B side (head mounted display 200 side), CEC is functioned. The operation of the CEC control is specified by physical location information as physical addresses stored in the EDID-ROMs. Regarding the physical addresses, the physical addresses of all devices connected via HDMI are determined by the physical address provided by the root device at the lowermost stream side (the broadcast receiving device 100 or the head mounted display 200 in one embodiment).

Figure 3:
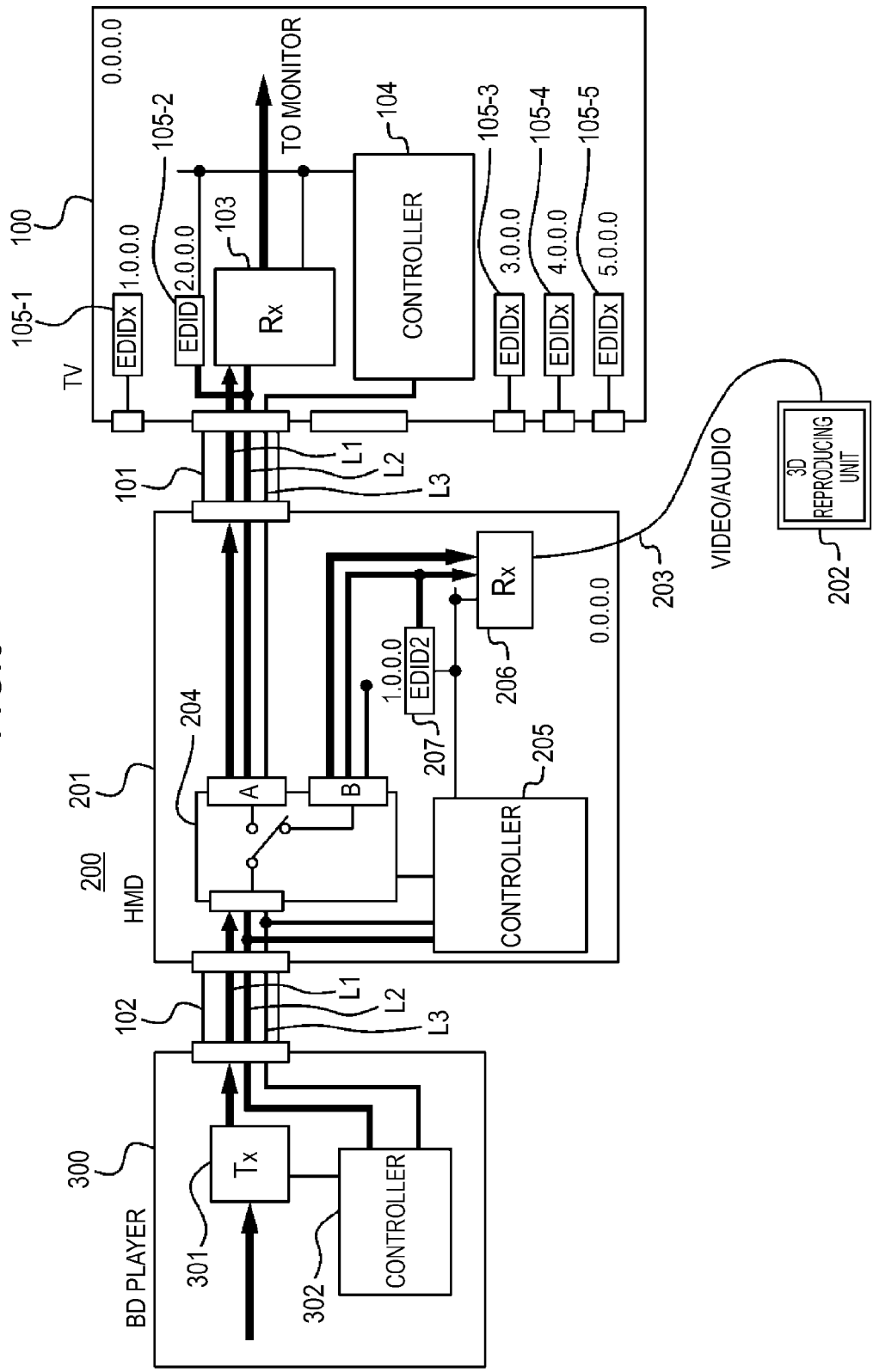
FIG. 3 is a connection diagram showing examples of physical addresses in the content reproduction system shown in FIG. 2.

When the switch 204 of the switching unit 201 selects the A side, the broadcast receiving device 100 serves as a root device (that is, the physical address of itself is "0.0.0.0") (see FIG. 3). The switching unit 201 is connected to the location of the input terminal where the value of the physical address provided to the BD player 300 by the broadcast receiving device 100 is "2.0.0.0". That is, the physical address stored in the EDID-ROM 105-2 is "2.0.0.0". Note that the physical addresses "1.0.0.0", "3.0.0.0", "4.0.0.0", "5.0.0.0" are stored in the EDID-ROMs 105-1, 105-3, 105-4, 105-5 in the locations of the other input terminals of the broadcast receiving device 100, respectively.

On the other hand, when the switch 204 is switched to select the B side, the head mounted display 200 serves as a root device (that is, the physical address of itself is "0.0.0.0"). The physical address provided to the BD player 300 through the B side of the switch 204 is "1.0.0.0".

Therefore, when the switch 204 selects the A side, the physical address of the BD player 300 is "2.0.0.0", and, when the switch 204 selects the B side, the physical address of the BD player 300 is "1.0.0.0". The physical address of the BD player 300 dynamically changes in response to the switching operation of the switch 204. The BD player 300 performs the subsequent CEC operation with the value. In the system configuration, no problem with CEC control occurs in most cases.

Figure 4:
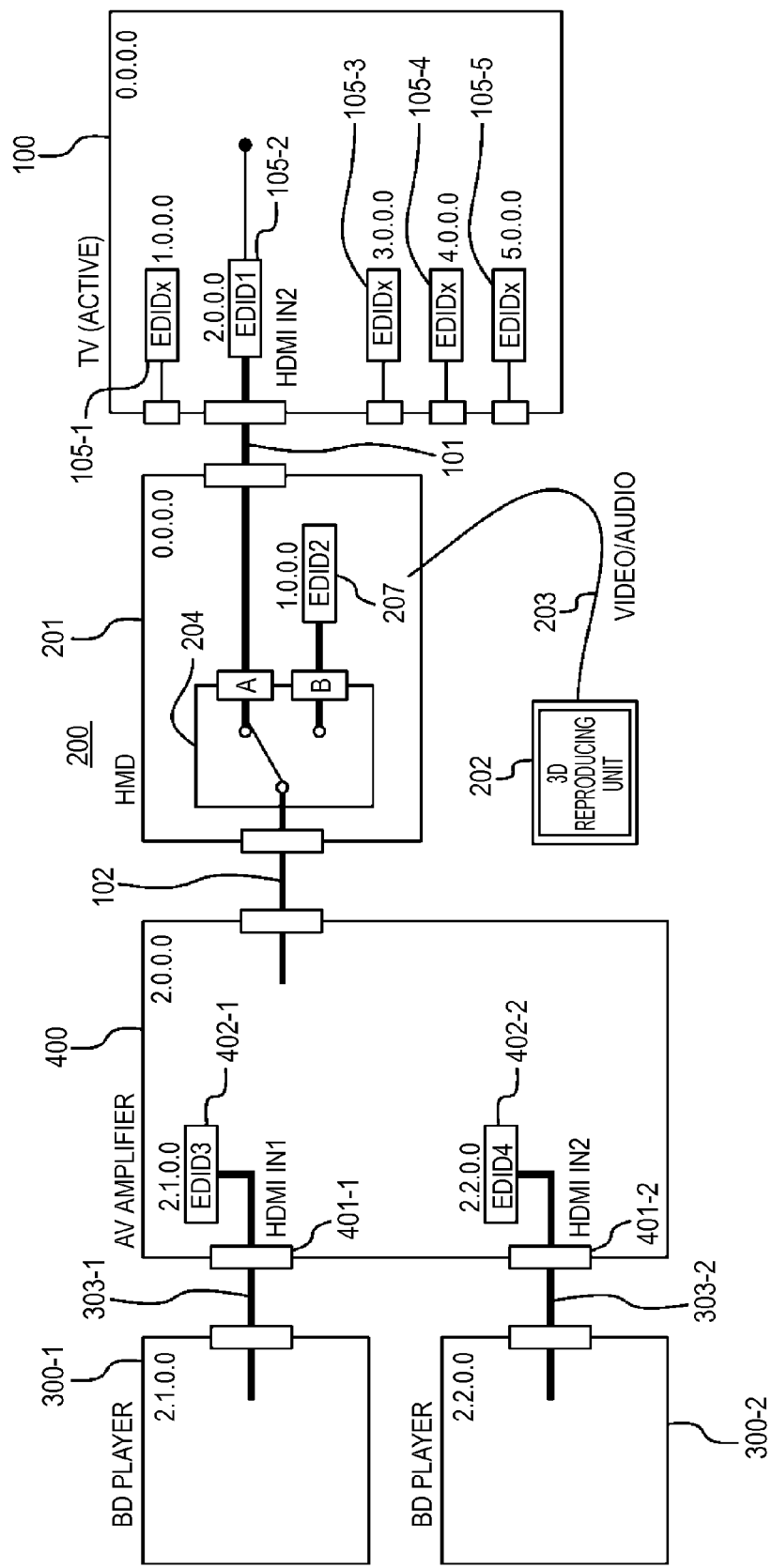
FIG. 4 is a connection diagram showing examples of physical addresses in a content reproduction system with an additional AV amplifier.

In the case where a user has already had a content reproduction system including an AV amplifier, a system configuration shown in FIG. 4 is employed. That is, two players, for example, BD players 300-1 and 300-2 are connected to input terminals 401-1 and 401-2 of an AV amplifier 400 via HDMI cables 303-1 and 303-2, respectively. A Physical address, for example, "2.1.0.0" is stored in an EDID-ROM 402-1 associated with the input terminal 401-1, and a physical address, for example, "2.2.0.0" is stored in an EDID-ROM 402-2 associated with the input terminal 401-2.

The input terminal of the switching unit 201 of the head mounted display 200 is connected via the HDMI cable 102 to the output terminal of the AV amplifier 400. The HDMI connection between the switching unit 201 and the broadcast receiving device 100 is the same as that in FIG. 3.

As shown in FIG. 4, when the switch 204 selects the A side, the broadcast receiving device 100 provides a physical address "2.0.0.0" to the AV amplifier 400. Because the physical address of the AV amplifier 400 is "2.0.0.0", the AV amplifier 400 provides a physical address "2.1.0.0" to the BD player 300-1 connected to the input terminal 401-1, and provides a physical address "2.2.0.0" to the BD player 300-2 connected to the input terminal 401-2.

Figure 5:
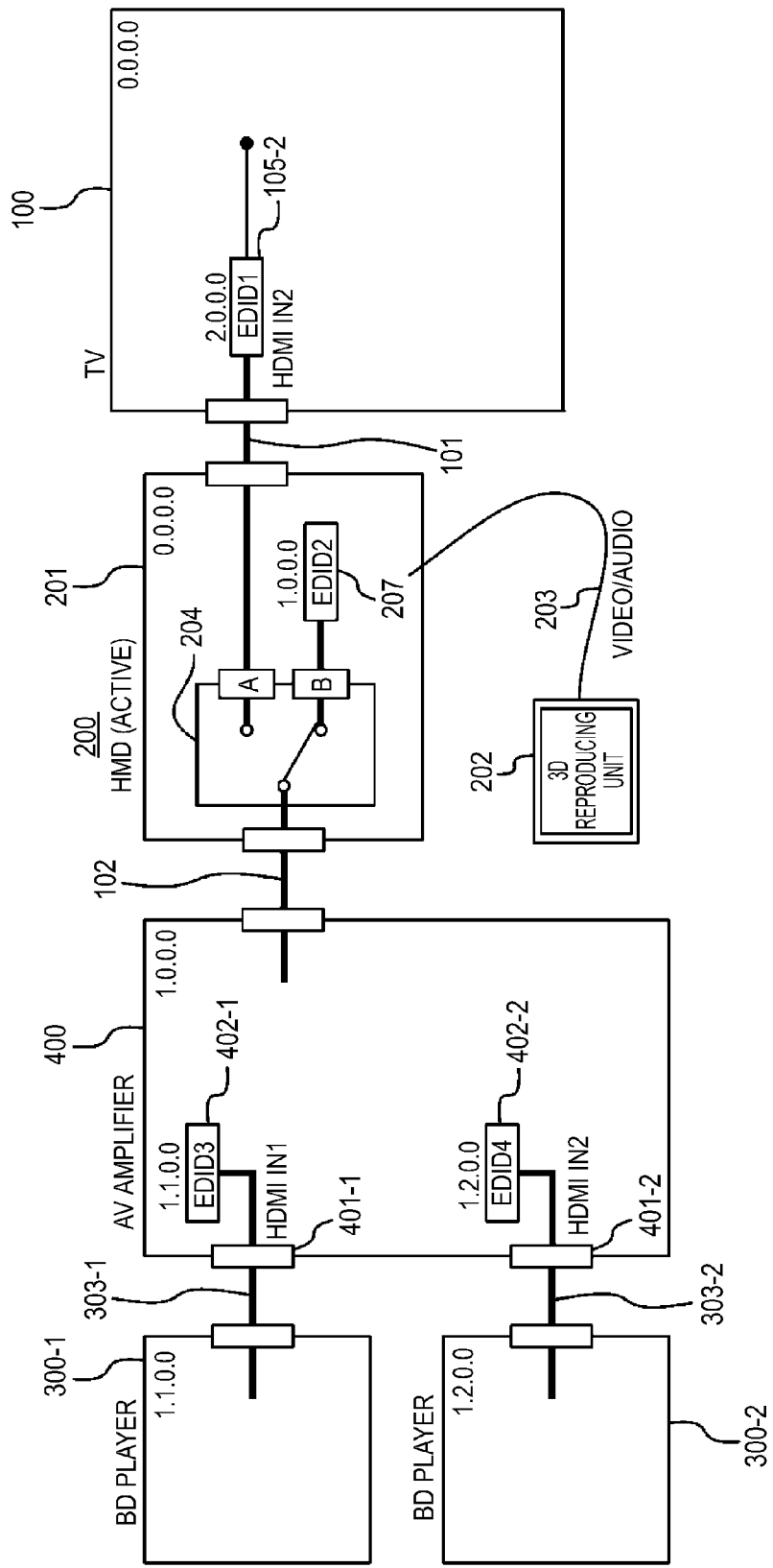
FIG. 5 is a connection diagram showing examples of physical addresses in the content reproduction system shown in FIG. 4.

Next, FIG. 5 shows the state in which the switch 204 has been switched to the B side from the connection relations shown in FIG. 4. When the switch 204 selects the B side, the head mounted display 200 itself receives the video/audio data sent from the BD player 300-1 or 300-2. Therefore, the physical address provided to the AV amplifier 400 by the head mounted display 200 is switched to "1.0.0.0". When the switch 204 is switched to the B side, the physical address stored in the EDID-ROM 402-1 is immediately updated to "1.1.0.0", and the physical address stored in the EDID-ROM 402-2 is immediately updated to "1.2.0.0".

As shown in FIG. 5, when the switch 204 is switched from the A side to the B side, the physical addresses provided to the BD players 300-1 and 300-2 connected to the AV amplifier 400 by the AV amplifier 400 are switched to "1.1.0.0" and "1.2.0.0", respectively. If the values of the physical addresses stored in the EDID-ROMs associated with all connection terminals of the AV amplifier 400 are updated immediately in response in the above described manner, no problem occurs.

However, in the HDMI standard, as described above, when the switch 204 is switched from the A side to the B side, compliance with switching between physical addresses with real time is not specified. Therefore, as an AV amplifier, when the downstream sink device is switched, there may be a configuration in which only the physical address of the input terminal currently in selection is updated. In the case of the AV amplifier having the configuration (AV amplifier 400'), a problem may occur.

Figure 6:
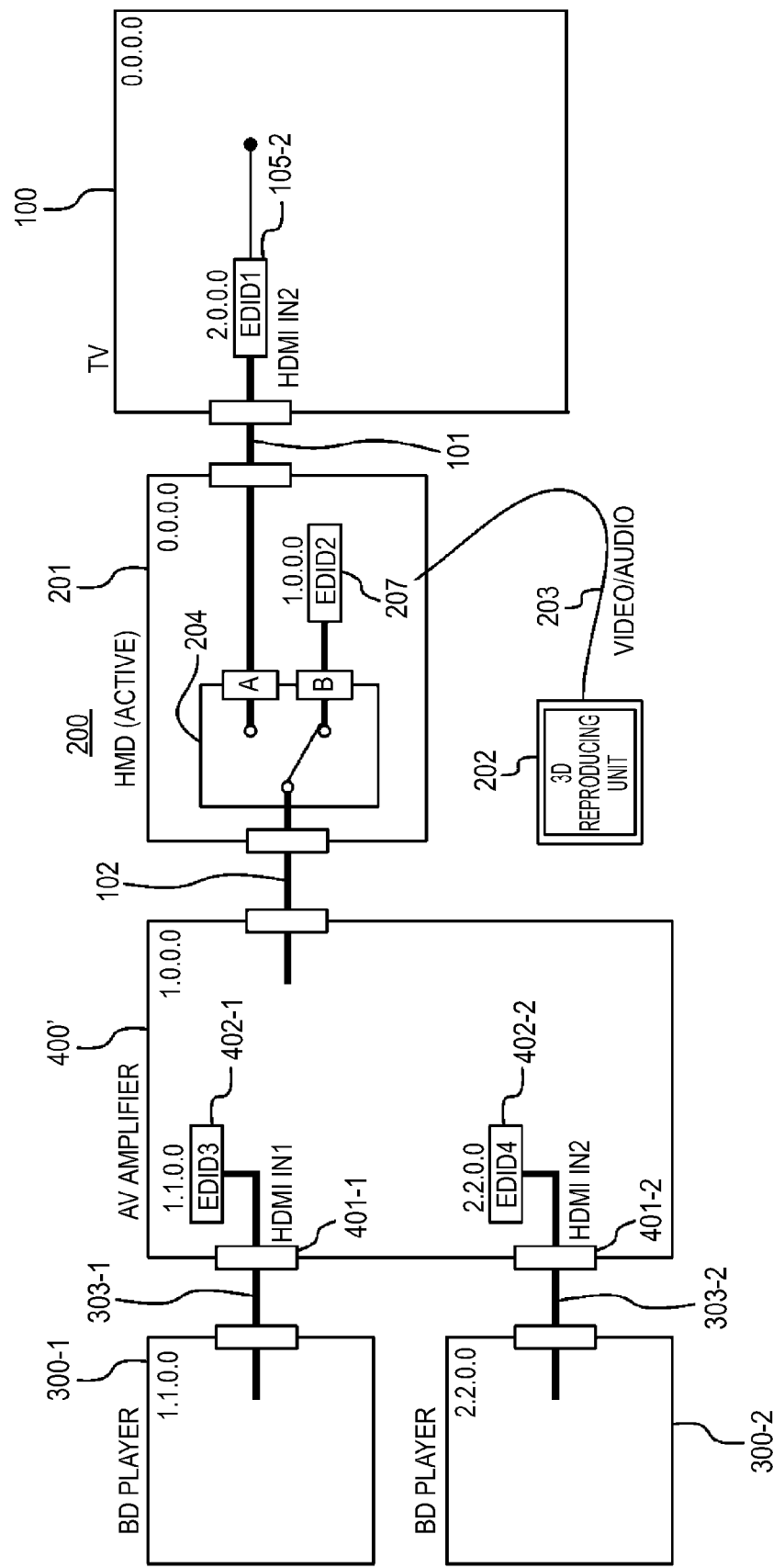
FIG. 6 is a connection diagram showing examples of physical addresses in the content reproduction system shown in FIG. 4.

Occurrence of a problem will be explained with reference to FIG. 6. FIG. 6 shows a state after the switch 204 is switched from the A side to the B side from the state in FIG. 4. Currently, when the input terminal 401-1 connected to the BD player 300-1 is selected in the AV amplifier 400', the physical address stored in the EDID-ROM 402-1 associated with the input terminal 401-1 in selection is immediately updated to "1.1.0.0". On the other hand, the physical address stored in the EDID-ROM 402-2 associated with the input terminal 401-2 not in selection is not immediately updated and remains "2.2.0.0". As a result, the physical address provided to the BD player 300-2 is not updated. The physical address may not be updated to "1.2.0.0" until the user selects the input terminal 401-2 by manual operation in the AV amplifier 400'.

As described above, there may be the AV amplifier 400' by which the BD player 300-2 remains to have the old address in the HDMI standard. In the state in which the BD player 300-2 has the physical address shown in FIG. 6, when one-touch play of CEC is performed from the BD player 300-2, a command is issued with the physical address "2.2.0.0" from the BD player 300-2.

The one-touch play refers to a function of mutual control between devices using CEC by which, when operation of the BD player (insertion of a disc, pressing of the play button) is performed, power of the AV amplifier is turned on and input switching is automatically performed. To fulfill the one-touch play function, originally, a command is necessary to be issued with the physical address "1.2.0.0". Therefore, in the AV amplifier 400', a trouble that the switching operation of automatically selecting the input terminal 401-2 connected to the BD player 300-2 is disabled or the like arises.

The present disclosure solves the problem. That is, when the switch 204 of the head mounted display 200 is switched from the A side to the B side, if there is no change in the value of the physical address provided to the AV amplifier 400 (or the AV amplifier 400') by the head mounted display 200, there is no change in the physical address provided to the BD player 300-1 or 300-2 connected at the upstream side of the AV amplifier 400. Therefore, the function of mutual control between devices by CEC is not deteriorated before and after the switching of the switch 204.

The present disclosure sets the physical address of the head mounted display 200 identical to the physical address of the broadcast receiving device 100. That is, a mechanism of mirroring the physical addresses is provided, and thus, the physical addresses provided to the AV amplifier 400 by the head mounted display 200 may be identical before and after the switching of the switch 204 from the A side to the B side.

Figure 7:
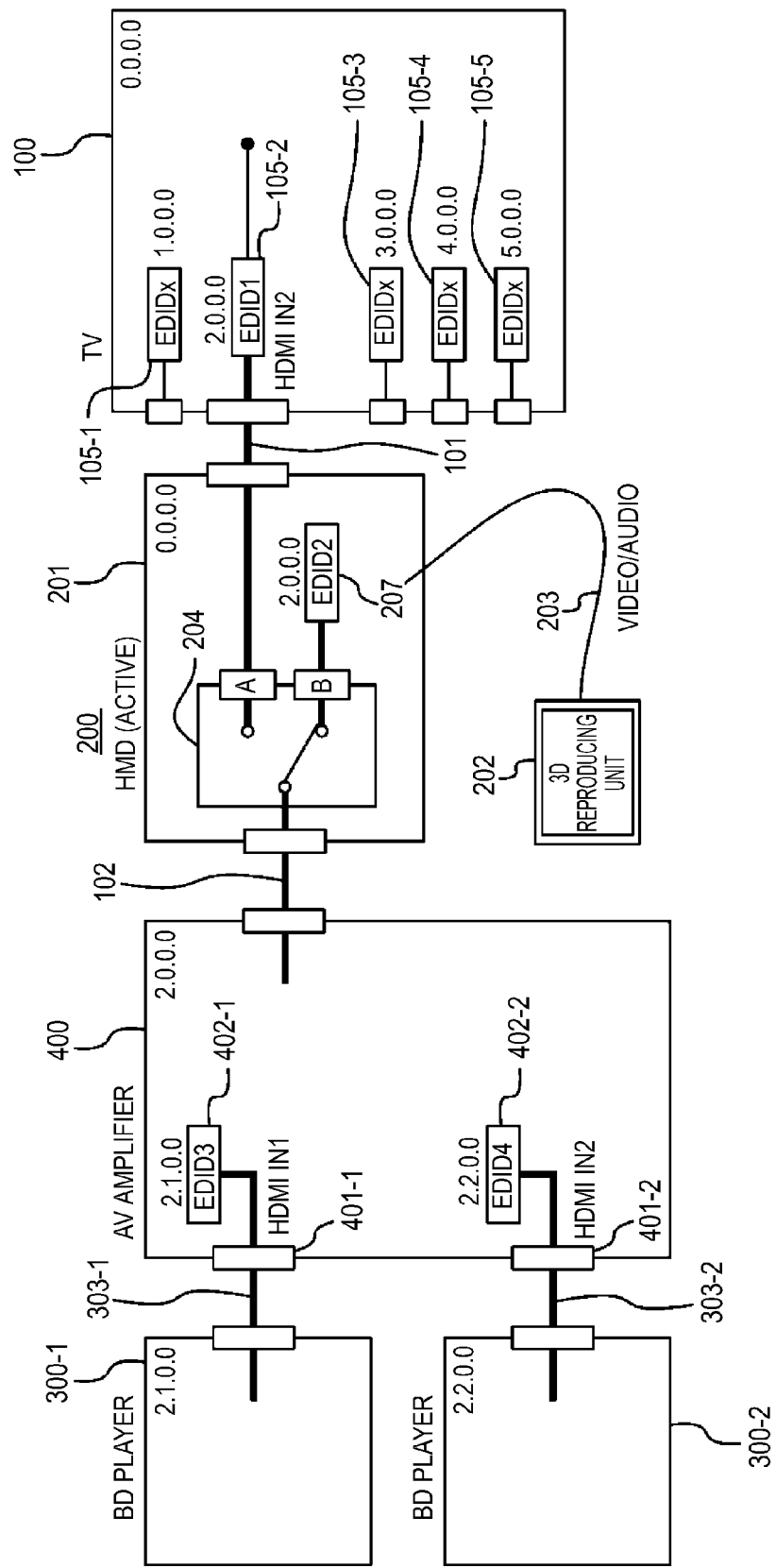
FIG. 7 is a connection diagram showing examples of physical addresses in one embodiment of the present disclosure.

The connection relations in FIG. 7 show the state after the switch 204 is switched from the A side to the B side like the connection relations in FIG. 6. In an EDID-ROM 207 of the switching unit 201 of the head mounted display 200, a physical address "2.0.0.0" having the same value as that stored in the EDID-ROM 105-2 of the input terminal of the broadcast receiving device 100 is stored.

Therefore, before and after the switching of the switch 204, the physical address provided to the AV amplifier 400 (or the AV amplifier 400') is not changed. This means that, in the AV amplifier 400, updating of the EDID-ROM 402 and 402-2 associated with the input terminals connected to the BD players 300-1 and 300-2, respectively, is unnecessary. Therefore, even when the AV amplifier 400 is of the type that is impossible to update the EDID-ROMs associated with all input terminals including non-selected input terminals (AV amplifier 400'), malfunction of the device cooperative control by CEC may be prevented.

Processing of one embodiment of the present disclosure will be explained with reference to a flowchart in FIG. 8. Step S1 is preliminary preparation (or preliminary setting). At step S1, in the switching unit 201 of the head mounted display 200, when the switch 204 selects the A side, the video/audio data from the BD player 300-1 is supplied via the HDMI cable 303-1, the AV amplifier 400, the HDMI cable 102, the switch 204, and the HDMI cable 101 to the broadcast receiving device 100, and the data is reproduced in the broadcast receiving device 100.

In this regard, the BD player 300-1 performs reading and authentication operation of the EDID performance of the broadcast receiving device 100 using the I2C bus (step S2). The contents that the BD player 300-1 communicates with the broadcast receiving device 100 via the I2C bus contain physical address information provided to the BD player 300-1 by the broadcast receiving device 100.

At step S3, the head mounted display 200 intercepts the data that the BD player 300-1 communicates with the broadcast receiving device 100 via the I2C bus. Specifically, a controller 205 of the switching unit 201 intercepts the data. In the case where the controller 205 may read the physical address provided to the BD player 300-1 by the broadcast receiving device 100 from the communication contents, the value of the physical address is stored in a memory (RAM, EEPROM, or the like) of the controller 205, and further, the controller 205 stores the value of the read physical address in the EDID-ROM 207 (step S4).

After step S4 is executed, as shown by step S5, even when the switch 204 is switched from the A side to the B side, the physical address provided to the BD player 300-1 is not changed. Using the mechanism, if the AV amplifier 400' specified to have the input terminal with the physical address that may not be immediately updated when the switch 204 is switched to the B side is used, no problem occurs.

That is, as shown by the example in FIG. 7, before and after the switching of the switch 204, the physical address provided to the AV amplifier 400 remains "2.0.0.0" without change. Therefore, when the reproduction operation of the BD player 300-2 not in selection is started, input switching of the AV amplifier 400 is performed, and the one-touch play by which the content of the video/audio data is reproduced by the broadcast receiving device 100 via the head mounted display 200 (an example of device cooperative operation by CEC) may be performed without trouble.

The present disclosure may be implemented as the following configuration.

(1) A content reproducing device including:

an input unit connected to a source side via a content transmission channel for transmitting a content and a control signal transmission channel for transmitting an address representing a physical connection relation of a device;

an output unit connected to a sink side via a content transmission channel for transmitting a content and a control signal transmission channel for transmitting an address representing a physical connection relation of a device; and a switch that is provided between the input unit and the output unit and assumes one of a first connection state of connecting between the input unit and the output unit and a second connection state of connecting the input unit and a content reproducing unit, and the device acquiring the address at the sink side transmitted via the control signal transmission channel in the first connection state of the switch, and setting the acquired address as the address provided to the source side in the second connection state of the switch.

(2) The content reproducing device according to (1), wherein the source side includes a repeater that is connected to plural sources and selects one source.

(3) The content reproducing device according to (1) or (2), wherein the source side includes a repeater that is connected to plural sources and selects one source, and when the switch is switched from the first connection state to the second connection state, only parts of the addresses provided to the plural sources by the repeater are updated.

(4) The content reproducing device according to (1), (2), or (3), wherein the input unit and the output unit are compliant with the HDMI (High-definition multimedia interface, registered trademark) standard.

(5) The content reproducing device according to (1), (2), (3), or (4), wherein a first display device is connected to the sink side and the content reproducing unit is a second display device.

(6) The content reproducing device according to (1), (2), (3), (4) or (5), wherein a broadcast receiving device is connected to the sink side and the content reproducing unit is a head mounted display.

(7) A content reproduction control method including:
connecting to a source side via a content transmission channel for transmitting a content and a control signal transmission channel for transmitting an address representing a physical connection relation of a device by an input unit;
connecting to a sink side via a content transmission channel for transmitting a content and a control signal transmission channel for transmitting an address representing a physical connection relation of a device by an output unit;
switching a first connection state of connecting between the input unit and the output unit and a second connection state of connecting the input unit and a content reproducing unit by a switch provided between the input unit and the output unit; and
acquiring the address at the sink side transmitted via the control signal transmission channel in the first connection state of the switch, and setting the acquired address as the address provided to the source side in the second connection state of the switch.

It should be understood by those skilled in the art that various modifications, combinations, sub-combinations and alterations may occur depending on design requirements and other factors insofar as they are within the scope of the appended claims or the equivalents thereof.

What is claimed is:

1. A content reproducing device comprising:
    an input unit connected to a source side via a first control signal transmission channel;
    an output unit connected to a sink side via a second control signal transmission channel; and
    a switch that is provided between the input unit and the output unit, wherein the switch changes from a first connection state to a second connection state, wherein in the first connection state, the switch connects the input unit and the output unit and in the second connection state, the switch connects the input unit and a content reproducing unit,
    wherein the content reproducing device reads an address at the sink side transmitted via the second control signal transmission channel in the first connection state of the switch, and sets the read address as an address provided to the source in the second connection state of the switch.

2. The content reproducing device according to claim 1, wherein the source side includes a repeater that is connected to plural sources and selects one source.

3. The content reproducing device according to claim 1,
    wherein the source side includes a repeater that is connected to plural sources and selects one source, and
    when the switch is switched from the first connection state to the second connection state, only parts of addresses provided to the plural sources by the repeater are updated.

4. The content reproducing device according to claim 1, wherein the input unit and the output unit are compliant with a predefined standard.

5. The content reproducing device according to claim 1, wherein a first display device is connected to the sink side and the content reproducing unit is a second display device.

6. The content reproducing device according to claim 1, wherein a broadcast receiving device is connected to the sink side and the content reproducing unit is a head mounted display.

7. A content reproduction control method comprising:
    connecting an input unit to a source side via a first control signal transmission channel;
    connecting an output unit to a sink side via a second control signal transmission channel;
    switching from a first connection state of connecting the input unit and the output unit to a second connection state of connecting the input unit and a content reproducing unit by a switch provided between the input unit and the output unit;
    reading an address at the sink side transmitted via the second control signal transmission channel in the first connection state of the switch; and
    setting the read address as an address provided to the source side in the second connection state of the switch.

* * * * *